(12) United States Patent
Zhang et al.

(10) Patent No.: US 7,858,691 B2
(45) Date of Patent: Dec. 28, 2010

(54) FUNCTIONALIZATION OF CARBON NANOSHPERES BY SEVERE OXIDATIVE TREATMENT

(75) Inventors: Cheng Zhang, Pennington, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 425 days.

(21) Appl. No.: 11/869,519

(22) Filed: Oct. 9, 2007

(65) Prior Publication Data
US 2009/0093582 A1    Apr. 9, 2009

(51) Int. Cl.
*B60C 1/00*    (2006.01)
*C08K 3/04*    (2006.01)
(52) U.S. Cl. .................... 524/496; 423/447.1
(58) Field of Classification Search ................ 524/496; 423/447.1
See application file for complete search history.

(56) References Cited

U.S. PATENT DOCUMENTS

| | | | |
|---|---|---|---|
| 6,187,823 B1 | 2/2001 | Haddon et al. ................ 516/32 |
| 6,203,814 B1 | 3/2001 | Fisher et al. ................ 424/443 |
| 6,331,262 B1 | 12/2001 | Haddon et al. .............. 252/502 |
| 6,368,569 B1 | 4/2002 | Haddon et al. .............. 423/460 |
| 6,531,513 B2 | 3/2003 | Haddon et al. ................ 516/32 |
| 6,824,755 B2 | 11/2004 | Colbert et al. ........... 423/447.1 |
| 6,875,274 B2 | 4/2005 | Wong et al. ................ 117/105 |
| 6,890,676 B2 | 5/2005 | Nuber et al. ................. 429/33 |
| 6,936,233 B2* | 8/2005 | Smalley et al. ........... 423/447.1 |
| 7,125,533 B2 | 10/2006 | Khabashesku et al. ... 423/447.1 |
| 2005/0232844 A1 | 10/2005 | Diner et al. .............. 423/447.2 |
| 2006/0137487 A1* | 6/2006 | McKinnon et al. ............ 75/252 |
| 2006/0199770 A1 | 9/2006 | Bianco et al. ................ 514/17 |
| 2006/0275956 A1 | 12/2006 | Konesky ..................... 438/128 |

FOREIGN PATENT DOCUMENTS

| | | |
|---|---|---|
| JP | 2004168570 | 6/2004 |
| JP | 2004323738 | 11/2004 |
| JP | 2005194180 | 7/2005 |
| JP | 2005263607 | 9/2005 |
| WO | WO 2007/044614 * | 4/2007 |

OTHER PUBLICATIONS

Sangjin Han, Simple Solid-Phase Synthesis of Hollow Graphitic Nanoparticles and their Applications to Direct Methanol Fuel Cell Electrodes, Wiley-VCH Verlag GmbH &Co. KGaA, Advanced Matter 2003, 15, No. 22, pp. 1922-1925.*
Chen, Y., et al., "Chemical attachment of organic functional groups to a single-walled carbon nanotube material", *Materials Research Society* (1998).
Garrigue, P., et al., "Top-Down Approach for the Preparation of Collodial Nanoparticles", *Chem. Mater.*, vol. 16, No. 16, pp. 2984-2986 (2004).
Kuznetsova, A., et al., "Oxygen-Containing Functional Groups on Single-Wall Carbon Nanotubes: NEXAFS and Vibrational Spectroscopic Studies", *J. Am. Chem. Soc.*, vol. 123, No. 43, pp. 10699-10704 (2001).
Miyata, Y., et al., "Selective Oxidation of Semiconducting Single-Wall Carbon Nanotubes by Hydrogen Peroxide", *Journal of Physical Chemistry B*, vol. 110, pp. 25-29, (2006).
Roy, B., et al., "Studies on water soluble conducting polymer Aniline initiated polymerization of *m*-aminobenzene sulfonic acid", *Synthetic Metals 100*, 233-236 (1999).
Zhao, B., et al., "Synthesis and Characterization of Water Soluble Single-Walled Carbon Nanotube Graft Copolymers", *J. Am. Chem. Soc.*, vol. 127, No. 22 (2005).
Zhao, B., et al., "Synthesis and Properties of a Water-Soluble Single-Walled Carbon Nanotube-Poly(*m*-aminobenzene sulfonic acid) Graft Copolymer", *Advanced Functional Materials*, vol. 14, No. 1 (2004).

* cited by examiner

*Primary Examiner*—James Seidleck
*Assistant Examiner*—Deve Valdez
(74) *Attorney, Agent, or Firm*—Workman Nydegger

(57) ABSTRACT

Carbon nanostructures are formed from a carbon precursor and catalytic templating nanoparticles and are treated with a severe oxidative agent to introduce oxygen-containing functional groups to the surface of the graphitic material. Methods for manufacturing carbon nanostructures generally include (1) forming a precursor mixture that includes a carbon precursor and a plurality of catalytic templating particles, (2) carbonizing the precursor mixture to form an intermediate carbon material including carbon nanostructures, amorphous carbon, and catalytic metal, (3) purifying the intermediate carbon material by removing at least a portion of the amorphous carbon and optionally at least a portion of the catalytic metal, and (4) treating the intermediate carbon material with a severe oxidative treatment to increase surface functionalization. Examples of oxidative treatments include (i) a mixture of nitric acid and sulfuric acid, (ii) a solution of hydrogen peroxide, or (iii) a mixture of sulfuric acid and hydrogen peroxide.

24 Claims, 2 Drawing Sheets

FUNCTIONALIZATION OF CARBON NANOSHPERES BY SEVERE OXIDATIVE TREATMENT

BACKGROUND OF THE INVENTION

1. The Field of the Invention

The present invention relates generally to the manufacture of carbon nanomaterials. More particularly, the present invention relates to methods for manufacturing carbon nanostructures that have a high content of surface functional groups.

2. The Related Technology

Carbon materials have been used in a variety of fields as high-performance and functional materials. Pyrolysis of organic compounds is known to be a useful method for preparing carbon materials. For example, carbon materials can be produced by pyrolyzing resorcinol-formaldehyde gel at temperatures above 600° C.

Most carbon materials obtained by pyrolysis of organic compounds at temperatures between 600-1400° C. tend to be amorphous or have a disordered structure. Obtaining highly crystalline or graphitic carbon materials can be very advantageous because of the unique properties exhibited by graphite. For example, graphitic materials can be conductive and form unique nanomaterials such as carbon nanotubes. However, using existing methods it is difficult to make these well-crystallized graphite structures using pyrolysis, especially at temperatures less than 2000° C.

To acquire the graphitic structure at lower temperature many studies have been carried out on carbonization in the presence of a metal catalyst. The catalyst is typically a salt of iron, nickel, or cobalt that is mixed with carbon precursor. Using catalytic graphitization, graphitic materials can be manufactured at temperatures between 600° C. and 1400° C.

Recently, this method has been used to manufacture carbon nanotubes and other carbon nanostructures. The carbon nanostructures are manufactured by mixing a carbon precursor with iron nanoparticles and carbonizing the precursor to cause the carbon nanostructure to grow from or around the iron nanoparticles. The iron nanoparticles are removed from the material by treating with strong acids. The amorphous carbon is typically removed using an oxidizing agent such as potassium permanganate.

BRIEF SUMMARY OF THE INVENTION

The present invention relates to novel methods for manufacturing carbon nanostructures (e.g., carbon nanospheres) that are surface functionalized with oxygen bearing molecules. The carbon nanostructures are treated using severe oxidative treatment. The severe oxidative treatment introduces a surprisingly large quantity of oxygenated functional groups on the surface of the carbon nanostructures, which gives the carbon nanostructures improved solubility in aqueous solutions and other hydrophilic materials, while retaining a high graphitic content.

In one embodiment, the carbon nanostructures are manufactured from a carbon precursor using catalytic metal templating nanoparticles. During the manufacturing process, the carbon nanostructures are produced as part of an intermediate carbon material that includes the carbon nanostructures and amorphous carbon. The intermediate carbon material is purified to remove amorphous carbon. For example, the intermediate carbon material can be treated with an oxidizing agent to remove amorphous carbon. In addition to removing amorphous carbon, the oxidative treatment is carried out for a period of time and/or with a sufficiently strong oxidative treatment to introduce at least 10 wt % oxygen to the surface of the carbon nanostructures, as measured by XPS. In a preferred embodiment, the oxidative treatment is carried out for a duration of time sufficient to introduce at least about 12 wt % oxygen, more preferably at least about 15 wt % oxygen, and most preferably at least about 20 wt % oxygen, as measured using XPS. Examples of functional groups that can be introduced to the surface of the carbon nanostructures includes, but are not limited to, carboxylic acids, hydroxyl groups, hydronium groups, and the like.

In one embodiment, the method for manufacturing the carbon nanomaterial can be carried out in the following steps. A precursor mixture is formed that includes a carbon precursor and a plurality of templating nanoparticles. The templating nanoparticles include a catalytic metal (e.g., iron). The precursor mixture is carbonized (i.e., by heating) to form an intermediate carbon material that includes a plurality of carbon nanostructures, amorphous carbon, and optionally catalytic metal. The intermediate carbon material is purified by removing at least a portion of the amorphous carbon and optionally a portion of remaining catalytic metal. The purified intermediate carbon nanomaterial is then functionalized using a severe oxidative treatment to introduce at least 10 wt % oxygen to the surface of the graphitic nanomaterial. Critically, the oxidative treatment must be more severe than oxidative treatments that merely remove amorphous carbon and inadvertently leave low and generally useless quantities of oxygen-containing surface functional groups.

In one embodiment, the severe oxidation can be carried out using one or more of the following treatments: (i) a mixture of nitric acid and sulfuric acid, (ii) hydrogen peroxide, or (iii) a mixture of sulfuric acid and hydrogen peroxide. Examples of suitable concentrations of the forgoing for achieving severe oxidation include, but are not limited to, a mixture of sulfuric acid (98%) and nitric acid (70%) in a 3:1 v/v ratio; a solution of 30% hydrogen peroxide; or a mixture of sulfuric acid (98%) and hydrogen peroxide (30%) in a 4:1 v/v ratio. In one embodiment, the severe oxidative treatment is carried out in an ultrasonic bath for a period of time in a range from about 2 hours to about 48 hours.

In one embodiment of the invention, all or a portion of the nanostructures formed in the manufacturing process of the invention are nanospheres. The nanospheres are typically multi-walled, hollow carbon nanostructures with a maximum diameter in a range from about 10 nm to about 200 nm. Typically the nanospheres are not perfectly spherical, but have an aspect ratio of less than about 2:1 (i.e., width to height is less than 2:1), more preferably less than 1.5:1. In one embodiment, the carbon nanospheres have an irregular surface with graphitic defects that cause the nanospheres to have a shape that is not perfectly spherical. The graphitic defects are believed to contribute in part to the ability to achieve the desired surface functionalization.

The carbon material manufactured according to the method of the invention can be nearly pure nanospheres and/or nanosphere clusters. Alternatively a portion of the carbon material can be graphite sheets or other graphitic materials. The carbon nanomaterials can include non-graphitic amorphous carbon. However, it is typically advantageous to minimize the percentage of non-graphitic amorphous carbon by removing it during purification and/or by converting non-graphitic amorphous carbon to graphite during additional heat treatment steps.

The size and shape of the nanospheres of the invention, coupled with the relatively high degree of surface functionalization, is believed to facilitate the dispersion of the carbon nanomaterial into monomers and polymeric materials to a composite. The highly oxygenated surface allows the carbon nanomaterials to be more readily dispersed in aqueous solvents and other hydrophilic materials as compared to highly graphitic carbon nanostructures that are not surface functionalized, or that inadvertently include low quantities of oxygen-containing surface functional groups. Surprisingly, the severe oxidizing conditions do not significantly alter other beneficial properties or the graphitic nature of the carbon nanospheres. This is in contrast to some techniques using severe oxidation of carbon nanotubes, which are used to intentionally etch or cut carbon nanotubes.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

I. Introduction and Definitions

Figure 1A:
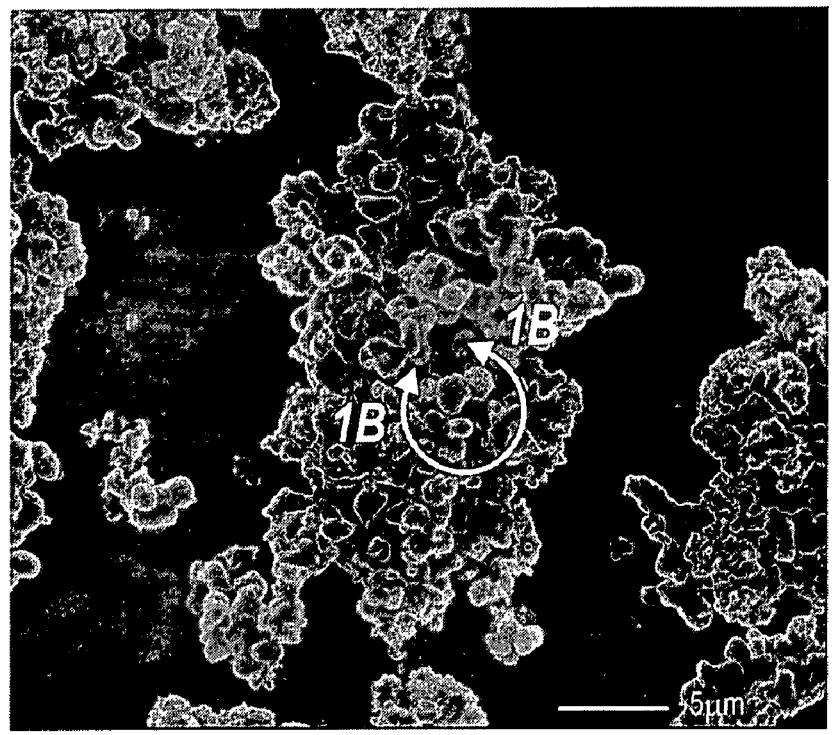
FIG. 1A is a high resolution SEM image of an intermediate carbon material of the present invention, which includes a plurality of nanosphere clusters.

The present invention is directed to methods for manufacturing carbon nanostructures (e.g., carbon nanospheres) and purifying the carbon nanostructures by removing amorphous carbon and then introducing oxygen-containing groups (e.g., hydroxyl and carboxylic acid groups) to the surface of the carbon nanostructures.

The carbon nanostructures are formed from a carbon precursor and catalytic templating nanoparticles. Methods for manufacturing carbon nanostructures generally include: (i) forming a precursor mixture that includes a carbon precursor and a plurality of catalytic templating particles, (ii) carbonizing the precursor mixture to form an intermediate carbon material including carbon nanostructures, amorphous carbon, and catalytic metal, (iii) purifying the intermediate carbon material by removing at least a portion of the amorphous carbon and optionally at least a portion of the catalytic metal (iv) subjecting the carbon nanomaterial to severe oxidation to introduce at least 10 wt % oxygen to the surface of the carbon nanostructures. All or a portion of steps (iii) and (iv) can be carried out simultaneously.

The carbon nanostructures manufactured using the foregoing steps have a plurality of carbon layers forming a wall that generally appears to define a nanosphere. In one embodiment, the carbon nanostructure can be characterized as hollow but irregularly shaped multi-walled, sphere-like (or spheroidal) nanostructures when analyzed in view of SEM images in combination with TEM images of the same material. In one embodiment, the carbon nanostructures form clusters of grape-like structures as seen in SEM images but which are known to be hollow multi-walled nanostructures as shown by TEM images of the same material. For purposes of this invention, the term nanosphere includes graphitic, hollow particles or balls that have an irregular outer shape.

II. Components Used to Manufacture Carbon Nanostructures

The following components can be used to carry out the above mentioned steps for manufacturing carbon nanostructures according to the present invention.

A. Carbon Precursor

Any type of carbon material can be used as the carbon precursor of the present invention so long as it can disperse the templating particles and carbonize around the templating particles upon heat treating. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The carbon precursor can be a single type of molecule (e.g., a compound that can polymerize with itself), or the carbon precursor can be a combination of two or more different compounds that co-polymerize together. For example, in an exemplary embodiment, the carbon precursor can be a resorcinol-formaldelyde gel. In this two compound embodiment, the formaldehyde acts as a cross-linking agent between resorcinol molecules by polymerizing with the hydroxyl groups of the resorcinol molecules.

Other examples of suitable carbon precursors include resorcinol, phenol resin, melamine-formaldehyde gel, poly (furfuryl alcohol), poly(acrylonitrile), sucrose, petroleum pitch, and the like. Other polymerizable benzenes, quinones, and similar compounds can also be used as carbon precursors and are known to those skilled in the art.

In an exemplary embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

B. Catalytic Templating Nanoparticles

The catalytic templating nanoparticles are used as a template for making the nanostructures. When mixed with the carbon precursor, the templating nanoparticles provide a nucleation site where carbonization and/or polymerization can begin or be enhanced. Because the templating nanoparticles are made from catalytic atoms, the templating particles can advantageously serve as both a nucleating site and as a catalyst for carbonization and/or polymerization.

The catalytic templating particles can be formed in more than one way. As described below, in one embodiment, the templating particles are formed from metal salts that agglomerate to form particles. Optionally, the catalyst atoms can be complexed with a dispersing agent to control formation of the particles. Templating nanoparticles formed using a dispersing agent tend to be more uniform in size and shape than templating particles formed without a dispersing agent.

1. Catalyst Atoms

The catalyst atom used to form the templating nanoparticles can be any material that can cause or promote carbonization and/or polymerization of the carbon precursor. In a preferred embodiment, the catalyst is a transition metal catalyst including but not limited to iron, cobalt, or nickel. These transition metal catalysts are particularly useful for catalyzing many of the polymerization and/or carbonization reactions involving the carbon precursors described above.

2. Dispersing Agents

Optionally, a dispersing agent can be complexed with the catalyst atoms to control formation of the templating nanoparticles. The dispersing agent is selected to promote the formation of nanocatalyst particles that have a desired stability, size and/or uniformity. Dispersing agents within the scope of the invention include a variety of small organic molecules, polymers, and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In a preferred embodiment, the molar ratio of dispersing agent functional groups to catalyst atoms is preferably in a range of about 0.01:1 to about 100:1, more preferably in a range of about 0.05:1 to about 50:1, and most preferably in a range of about 0.1:1 to 20:1.

The dispersing agents of the present invention allow for the formation of very small and uniform nanoparticles. In general, the nanocatalyst particles formed in the presence of the dispersing agent are less than 1 micron in size. Preferably the nanoparticles are less than 100 nm, more preferably less than 50 nm and most preferably less than 20 nm.

During pyrolysis of the carbon precursor, the dispersing agent can inhibit agglomeration and deactivation of the catalyst particles. This ability to inhibit deactivation can increase the temperature at which the nanocatalysts can perform and/or increase the useful life of the nanocatalyst in the extreme conditions of pyrolysis. Even if including the dispersing agent only preserves catalytic activity for a few additional milliseconds, or even microseconds, the increased duration of the nanocatalyst can be very beneficial at high temperatures, given the dynamics of carbonization.

3. Solvents and Other Additives

A solvent can optionally be used to prepare the catalyst atoms for mixing with the dispersing agent and/or the carbon precursor. The liquid medium in which the catalytic templating nanoparticles are prepared may contain various solvents, including water and organic solvents. Solvents participate in particle formation by providing, a liquid medium for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g., less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be more easily separated from the final iron catalyst solution or suspension using simple techniques such as centrifugation and filtration.

C. Reagents for Purifying Intermediate Carbon Materials

Various reagents can be used to remove amorphous carbon and/or the catalytic metals from the carbon nanostructures, thereby purifying the intermediate material. The purification can be carried out using any reagent or combination of reagents capable of selectively removing amorphous carbon (or optionally catalytic metal) while leaving graphitic material.

Reagents for removing amorphous carbon include oxidizing acids and oxidizing agents and mixtures of these. An example of a mixture suitable for removing amorphous carbon includes sulfuric acid, $KMnO_4$, $H_2O_2$, 5M or greater $HNO_3$, and aqua regia.

The catalytic metal can be removed using any reagent that can selectively dissolve the particular metal used as the catalyst without significantly destroying the carbon nanostructures, which are graphitic. Nitric acid is an example of a reagent suitable for dissolving many base transition metals such as, but not limited to, iron, cobalt, and nickel. Other examples of suitable reagents include hydrogen fluoride, hydrochloric acid, and sodium hydroxide.

D. Agents for Severe Oxidation

The agents used for severe oxidation are those that have the oxidative potential to introduce oxygen-containing functional groups to the surface of graphite. Examples of suitable oxidative treatments for introducing oxygen-containing functional groups to the surface of carbon nanospheres include (i) mixtures of nitric acid and sulfuric acid, (ii) solutions of hydrogen peroxide, and (iii) mixtures of sulfuric acid and hydrogen peroxide.

For mixtures of nitric acid and sulfuric acid, the nitric acid can be in a concentration from about 45% to about 5%, more preferably 35% to about 15% and the concentration of sulfuric acid can be in a range from about 98% to about 50%, more preferably in a range from about 85% to about 65% based on volume. The ratio of nitric acid to sulfuric acid can be in a range from about 1:10 to about 1:1, more preferably 1:5 to about 1:2.

For solution of hydrogen peroxide, the concentration of hydrogen peroxide can be in a range from about 50% to about 10%, more preferably in a range from about 40% to about 20% based on volume.

For a solution of sulfuric acid and hydrogen peroxide, the concentration of sulfuric acid can be in a range from about 98% to about 50%, more preferably about 95% to about 65% and the concentration of hydrogen peroxide can be in a range from about 50% to about 1%, more preferably about 25% to about 5% based on volume. The ratio of sulfuric acid to hydrogen peroxide can be in a range from about 10:1 to about 1:1, more preferably 5:1 to about 3:1.

Specific examples of suitable concentrations that fall within the forgoing ranges include, but are not limited to, a mixture of sulfuric acid and nitric acid (70%) in a 3:1 v/v ratio; a solution of 30% hydrogen peroxide; or a mixture of sulfuric acid (98%) and hydrogen peroxide (30%) in a 4:1 v/v ratio.

III. Manufacturing Carbon Nanostructures

The carbon nanostructures of the present invention can be manufactured using all or a portion of the following steps: (i) forming a precursor mixture that includes a carbon precursor and a plurality of templating nanoparticles, (ii) allowing or causing the carbon precursor to polymerize around the catalytic templating nanoparticles, (iii) carbonizing the precursor mixture to form an intermediate carbon material that includes a plurality of nanostructures (e.g., carbon nanospheres), amorphous carbon, and catalytic metal, (iv) purifying the intermediate carbon material by removing at least a portion of the amorphous carbon and optionally a portion of the catalytic metal, and (v) treating the carbon nanomaterial with an oxidative agent under conditions that cause severe oxidation to introduce functional groups to the surface of the carbon nanomaterial. If desired, the removal of amorphous carbon in step (iv) can be performed during the severe oxidative treatment of step (v).

A. Forming a Precursor Mixture

The precursor mixture is formed by selecting a carbon precursor and dispersing a plurality of catalytic templating nanoparticles in the carbon precursor.

The catalytic templating nanoparticles, which are dispersed in the carbon precursor, can be provided in several different ways. The templating nanoparticles can be formed in the carbon precursor (i.e., in-situ) or formed in a separate reaction mixture and then mixed with the carbon precursor. In some cases, particle formation may partially occur in a separate reaction and then be completed as the templating particles are mixed and/or heated in the carbon precursor (e.g., at the onset of a precursor polymerization step). The templating nanoparticles can also be formed using a dispersing agent that controls one or more aspects of particle formation or the templating nanoparticles can be made from metal salts.

In one embodiment, the templating nanoparticles are formed in the carbon precursor from a metal salt. In this embodiment, the templating nanoparticles are formed by selecting one or more catalyst metal salts that can be mixed with the carbon precursor. The metal salts are mixed with the carbon precursor and then allowed or caused to form nanoparticles in-situ.

In a more preferred embodiment, the templating particles are formed (in-situ or ex-situ) using a dispersing agent to control particle formation. In this embodiment, one or more types of catalyst atoms and one or more types of dispersing agents are selected. Next, the catalyst atoms (e.g., in the form of a ground state metal or metal salt) and dispersing agent (e.g., in the form of a carboxylic acid or its salt) are reacted or combined together to form catalyst complexes. The catalyst complexes are generally formed by first dissolving the catalyst atoms and dispersing agent in an appropriate solvent and then allowing the catalyst atoms to bond with the dispersing agent molecules. The various components may be combined or mixed in any sequence or combination. In addition, a subset of the components can be premixed prior to the addition of other components, or all components may be simultaneously combined.

In an embodiment of the invention, the components for the templating nanoparticles are allowed or caused to form nanoparticles by mixing the components for a period of about 1 hour to about 14 days. This mixing is typically conducted at temperatures ranging from 0° C. to 200° C. In one embodiment, the temperature does not exceed 100° C. Particle formation can also be induced using a reagent. For example, in some cases formation of particles or intermediate particles can be caused by bubbling hydrogen through the solution of catalyst complexes.

The templating nanoparticles of the present invention are capable of catalyzing polymerization and/or carbonization of the carbon precursor. The concentration of catalytic templating nanoparticles in the carbon precursor is typically selected to maximize the number of carbon nanostructures formed. The amount of catalytic templating particles can vary depending on the type of carbon precursor being used. In an example embodiment the molar ratio of carbon precursor to catalyst atoms is about 0.1:1 to about 100:1, more preferably about 1:1 to about 30:1.

B. Polymerizing the Precursor Mixture

The precursor mixture is typically allowed to cure for sufficient time such that a plurality of intermediate carbon nanostructures are formed around the templating, nanoparticles. Because the templating nanoparticles are catalytically active, the templating nanoparticles can preferentially accelerate and/or initiate polymerization of the carbon precursor near the surface of the templating particles.

The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

For hydrothermally polymerizable carbon precursors, polymerization typically occurs at elevated temperatures. In a preferred embodiment, the carbon precursor is heated to a temperature of about 0° C. to about 200° C., and more preferably between about 25° C. to about 120° C.

An example of a suitable condition for polymerization of resorcinol-formaldehyde gel (e.g., with iron particles and a solution pH of 1-14) is a solution temperature between 0° C. and 90° C. and a cure time of less than 1 hour to about 72 hours. Those skilled in the art can readily determine the conditions necessary to cure other carbon precursors under the same or different parameters.

In one embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

Forming intermediate carbon nanostructures from the dispersion of templating nanoparticles causes formation of a plurality of intermediate carbon nanostructures having unique shapes and sizes. Ultimately, the properties of the nanostructure can depend at least in part on the shape and size of the intermediate carbon nanostructure. Because of the unique shapes and sizes of the intermediate carbon nanostructures, the final nanostructures can have beneficial properties such as high surface area and high porosity, among others.

C. Carbonizing the Precursor Mixture

The precursor mixture is carbonized by heating to form an intermediate carbon material that includes a plurality of carbon nanostructures, amorphous carbon, and catalyst metal. The precursor mixture can be carbonized by heating the mixture to a temperature between about 500° C. and about 2500° C. During the heating process, atoms such as oxygen and nitrogen are volatilized or otherwise removed from the intermediate nanostructures (or the carbon around the templating nanoparticles) and the carbon atoms are rearranged or coalesced to form a carbon-based structure.

The carbonizing step typically produces a graphite based nanostructure. The graphite based nanostructure has carbon atoms arranged in structured sheets of $sp^2$ hybridized carbon atoms. The graphitic layers can provide unique and beneficial properties, such as electrical conduction and structural strength and/or rigidity.

D. Purifying the Intermediate Carbon Material

The intermediate carbon material is purified by removing at least a portion of non-graphitic amorphous carbon. This purification step increases the weight percent of carbon nanostructures in the intermediate carbon material.

The amorphous carbon is typically removed by oxidizing the carbon. The oxidizing agents used to remove the amorphous carbon are selective to oxidation of the bonds found in non-graphitic amorphous carbon but are less reactive to the pi bonds of the graphitic carbon nanostructures. The amorphous carbon can be removed by applying the oxidative agents or mixtures in one or more successive purification steps.

Optionally substantially all or a portion of the catalytic metals can be removed. Whether the catalytic metal is removed and the extent to which it is removed will depend on the desired use of the carbon nanomaterial. In some embodiments of the invention, the presence of a metal such as iron can be advantageous for providing certain electrical properties and/or magnetic properties. Alternatively, it may be desirable to remove the catalytic metal to prevent the catalytic metal for having an adverse affect on its ultimate use. For example, it can be advantageous to remove the metal if the carbon nanostructures are to be used as a catalyst support material for a fuel cell. Removing the catalytic templating particles can also improve the porosity and/or lower its density.

Typically, the templating nanoparticles are removed using acids or bases such as nitric acid, hydrogen fluoride, or sodium hydroxide. The method of removing the templating nanoparticles or amorphous carbon depends on the type of templating nanoparticle or catalyst atoms in the composite. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles and/or amorphous carbon so long as the removal process does not completely destroy the carbon nanostructures. In some cases it may even be beneficial to at least partially remove some of the carbonaceous material from the intermediate nanostructure during the purification process.

During the purification process, the oxidizing agents and acids have a tendency to introduce hydronium groups and oxygenated groups such as, but not limited to, carboxylates, carbonyls, and/or ether groups to the surface of the carbonaceous materials. The oxidizing agents and conditions used to merely remove amorphous carbon typically introduce less than 9 wt % oxygen to the surface of the carbon nanostructures, which is generally too low to import good water solubility. Unexpectedly, adding 10 wt % or more oxygen greatly improves such solubility.

Optionally, the purification process can also include additional heat treatment steps at temperatures and conditions that can convert residual amorphous carbon to graphite. In this optional step, residual carbon is more easily converted to a graphitic material since a substantial portion of the amorphous carbon has been removed and there is better heat transfer to the portion that remains.

E. Introducing Oxygen-Containing Functional Groups by Severe Oxidation

The intermediate carbon material is treated with a severe oxidizing agent to introduce oxygen-containing functional groups to the surface of the carbon nanostructures. The severity of the oxidative treatment can be controlled by selecting an oxidative agent with a particular oxidative potential or by increasing the duration of the oxidation or both.

In one embodiment, the severe oxidative treatment is selected from the group of (i) a mixture of nitric acid and sulfuric acid, (ii) a solution of hydrogen peroxide, or (iii) a mixture of sulfuric acid and hydrogen peroxide. For oxidative treatment (i), in one embodiment, the nitric acid has a concentration in a range from about 45% to about 5% v/v, the sulfuric acid has a concentration in a range from about 98% to about 50% v/v, and the nitric acid and the sulfuric acid are mixed in a volume to volume ratio in a range from about 1:10 to about 1:1. For oxidative treatment (ii), in one embodiment, the solution of hydrogen peroxide has a concentration in a range from about 50% to about 10% v/v. For oxidative treatment (iii), in one embodiment, the sulfuric acid has a concentration in a range from about 98% to about 60% v/v, the hydrogen peroxide has a concentration in a range from about 50% to about 5% v/v, and the sulfuric acid and the hydrogen peroxide are mixed in a volume to volume ratio in a range from about 10:1 to about 1:1.

Generally, the duration of the oxidative treatment will depend on the amount of amorphous carbon in the intermediate material (i.e., whether a prior purification step has been performed and if so, how much residual amorphous carbon remains), the strength of the oxidizing agent, and the desired amount of functional groups to be introduced. Typically, the rate of functionalization increases with decreasing residual amorphous carbon and increases with increasing oxidizing potential of the oxidizing agent. In one embodiment, the oxidative treatment is carried out for a period of time in a range from about 1 hours to about 48 hours, more preferably about 2 hours to about 24 hours. To facilitate oxidation, the oxidative treatment can be carried out using sonication.

In one embodiment, the oxidative treatment is carried out so as to introduce at least 10 wt % oxygen to the surface of the carbon nanomaterial, more preferably at least about 15 wt % oxygen, even more preferably at least about 20 wt % oxygen, and most preferably at least about 25 wt % oxygen as measured using X-ray Photoelectron Spectroscopy (XPS).

In one embodiment, the oxidative treatment is selected to introduce sufficient function groups to render the carbon nanomaterials dispersible in a polar solvent, including aqueous solvents and polar organic solvents.

IV. Carbon Nanostructures

The methods of the present invention produce a carbon nanomaterial having multi-walled carbon nanostructures. The carbon nanostructures within the carbon nanomaterial have useful properties such as unique shape, size, and/or electrical properties. The presence of the oxygen-containing functional groups on the surface of the carbon nanomaterial is believed to be responsible for at least some of the beneficial and novel properties of the carbon nanomaterials of the invention. For example, carbon nanomaterials having greater than 10 wt % oxygen have shown improved dispersibility in many monomeric and polymeric materials.

The carbon nanostructures of the invention are particularly advantageous for some applications where high porosity, high surface area, and/or a high degree of graphitization are desired. Carbon nanostructures manufactured as set forth herein can be substituted for carbon nanotubes, which are typically more expensive to manufacture.

The carbon nanostructures can be regular or irregularly shaped spheroidal structures. In one embodiment, the carbon nanospheres have an irregular surface with graphitic defects that cause the nanospheres to have a shape that is not perfectly spherical. The size and shape of the nanostructure is determined in large part by the size and shape of the templating nanoparticles used to manufacture the carbon nanostructures. Because the carbon nanostructures form around the templating nanoparticles, the hole or inner diameter of the carbon nanostructures typically corresponds to the outer diameter of the templating nanoparticles. The inner diameter of the carbon nanostructures can be between 0.5 nm to about 90 nm, more preferably between about 1 nm and about 50 nm n.

The carbon nanomaterials of the invention can be characterized by their weight percent of carbon nanostructures. The weight percent of carbon nanostructures (e.g., nanospheres) in the carbon nanomaterial can be greater than 10%, more preferably greater than 50%, even more preferably greater than 75%, and most preferably greater than 90%.

Alternatively, in addition to the weight percent of carbon nanostructures, the novel carbon nanomaterials can be characterized by the presence of oxygen containing surface functional groups. In one embodiment, the carbon nanomaterials have at least 10 wt % oxygen, preferably at least about 12 wt % oxygen, more preferably at least about 15 wt %, and most preferably at least about 20 wt % oxygen as measured using XPS. In one embodiment, the carbon nanomaterials are dispersable in a hydrophilic material, such as an aqueous solution. Examples of polar solvents that the carbon nanospheres can be dispersed in include, but are not limited to, water, alcohols (e.g., methanol and/or ethanol), THF, DMF, acetic acid, formic acid, trifluoroacetic acid, formamide, acetonitrile, $NH_2$—$NH_2$. One advantage of dispersing the carbon nanospheres in a polar solvent is that the carbon nanospheres can be more readily combined with some polymeric materials to form a composite.

Figure 1B:
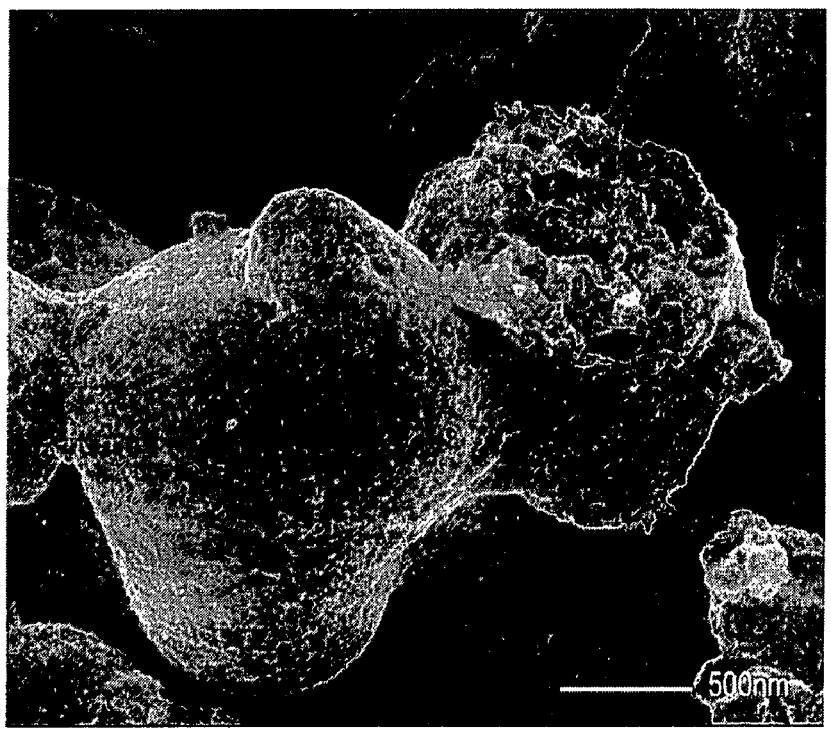
FIG. 1B is a high resolution SEM image showing a closer image of individual clusters of carbon nanostructures and showing one cluster that has been broken open to reveal the plurality of carbon nanostructures that make up the cluster.
Figure 2:
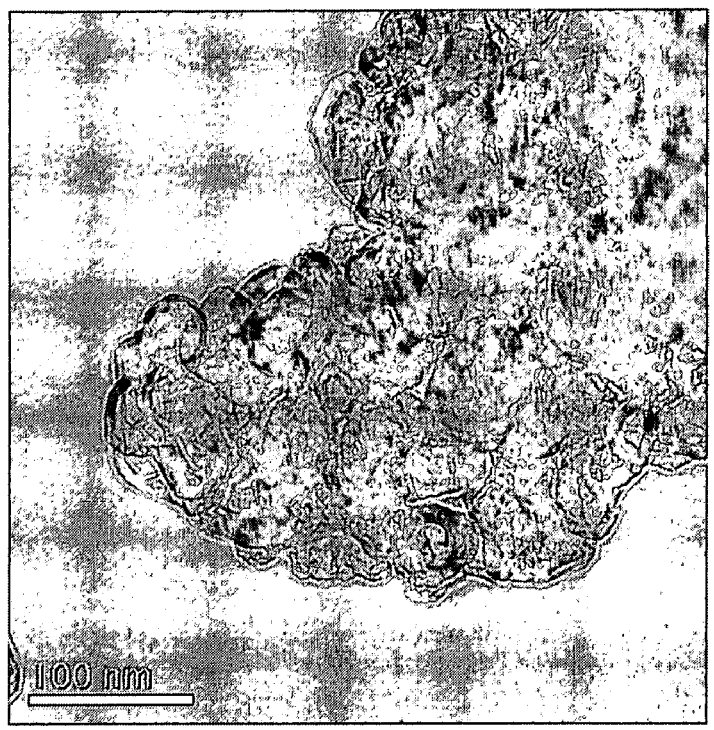
FIG. 2 is a high resolution TEM image of the carbon nanomaterial of FIG. 1A showing a plurality of carbon nanostructures agglomerated together and revealing the multi-walled and hollow nature of the carbon nanostructures that form a cluster.
Figure 3:
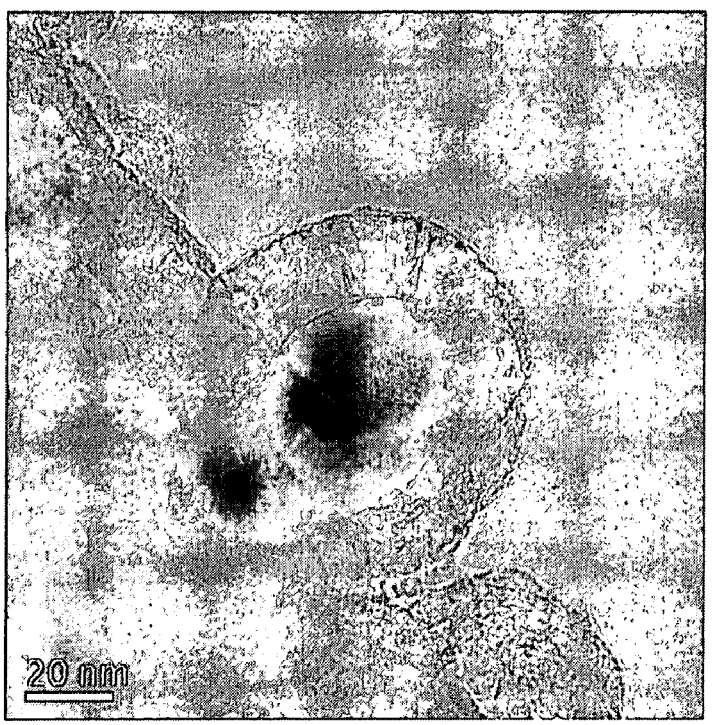
FIG. 3 is a high resolution TEM image showing a close up of a carbon nanostructure that has a catalytic templating nanoparticle in its center.

FIGS. 1A and 1B show SEM images of example nanostructures made according to the present invention, the details of which are described in Example 1 below. FIGS. 2 and 3 are TEM images of the nanomaterial shown in FIGS. 1A and 1B. The TEM images interpreted in light of the SEM images show that in one embodiment the nanostructures can have a generally spheroidal shape.

In FIG. 1A, the SEM image reveals that, at least in some embodiments, the carbon nanomaterial includes spheroidal or "grape-like" clusters of carbon nanostructures. FIG. 1B is a close-up of a cluster of carbon nanostructures that has been partially broken open thereby exposing a plurality of carbon nanostructures. The TEM image in FIG. 2 further shows that the clusters are made up of a plurality of smaller nanostructures. The cluster of nanostructures in FIG. 2 reveals that the nanostructures are hollow and generally spheroidal.

FIG. 3 is an even closer view of a carbon nanostructure that appears to have an iron templating nanoparticle remaining in the center of the carbon nanostructure. The carbon nanostructure of FIG. 3 illustrates that the formation of the carbon nanostructures occurs around the catalytic templating nanoparticles.

In many of the carbon nanostructures observed in TEM images, the outer diameter of the nanostructure is between about 10 nm and about 60 nm and the hollow center diameter is about 10 nm to about 40 nm. However, the present invention includes nanostructures having larger and smaller diameters. Typically, the carbon nanostructures have an outer diameter that is less than about 100 nm to maintain structural integrity.

The thickness of the nanostructure wall is measured from the inside diameter of the wall to the outside diameter of the wall. The thickness of the nanostructure can be varied during manufacture by limiting the extent of polymerization and/or carbonization of the carbon precursor as described above. Typically, the thickness of the carbon nanostructure wall is between about 1 nm and 20 nm. However, thicker and thinner walls can be made if desired. The advantage of making a thicker wall is greater structural integrity. The advantage of making a thinner wall is greater surface area and porosity.

The wall of the carbon nanostructure can also be formed from multiple graphitic layers. In an exemplary embodiment, the carbon nanostructures have walls of between about 2 and about 100 graphite layers, more preferably between about 5 and 50 graphite layers and more preferably between about 5 and 20 graphite layers. The number of graphitic layers can be varied by varying the thickness of the carbon nanostructure wall as discussed above. The graphitic characteristic of the carbon nanostructures is believed to give the carbon nanostructures beneficial properties that are similar to the benefits of multi-walled carbon nanotubes (e.g., excellent conductivity). They can be substituted for carbon nanotubes and used in many applications where carbon nanotubes can be used but often with predictably superior results.

While the SEM images and TEM images show nanostructures that are generally spherical, the present invention extends to nanostructures having shapes other than spheriodal. In addition, the nanostructures may be fragments of what were originally spheriodal shaped nanostructures.

Typically the shape of the carbon nanostructure will be at least partially determined by the shape of the templating nanoparticles. Thus, formation of non-spherical templating nanoparticles can lead to carbon nanostructures with non-spheroidal dimensions.

In addition to good electron transfer, the carbon nanostructures of the present invention can have high porosity and large surface areas. Adsorption and desorption isotherms indicate that the carbon nanostructures form a mesoporous material. The BET specific surface area of the carbon nanostructures can be between about 80 and about 400 m$^2$/g and is preferably greater than about 120 m$^2$/g, and typically about 200 m$^2$/g, which is significantly higher than the typical 100 m$^2$/g observed for carbon nanotubes. Even where the methods of the invention results in carbon nanostructures combined with non-structured graphite, this graphitic mixture (i.e., the carbon nanomaterial) typically has a surface area greater than carbon nanotubes. The high surface area and high porosity of the carbon nanostructures manufactured according to the present invention makes the carbon nanostructures useful for a variety of applications.

In one embodiment of the invention, the carbon nanospheres having oxygen-containing surface functional groups are incorporated into a polymeric material to form a composite. The polymeric material used to make the composite can be any polymer or polymerizable material compatible with graphitic materials. Example polymers include polyamines, polyacrylates, polybutadienes, polybutylenes, polyethylenes, polyethylenechlorinates, ethylene vinyl alcohols, fluoropolymers, ionomers, polymethylpentenes, polypropylenes, polystyrenes, polyvinylchlorides, polyvinylidene chlorides, polycondensates, polyamides, polyamide-imides, polyaryletherketones, polycarbonates, polyketones, polyesters, polyetheretherketones, polyetherimides, polyethersulfones, polyimides, polyphenylene oxides, polyphenylene sulfides, polyphthalamides, polythalimides, polysulfones, polyarylsulfones, allyl resins, melamine resins, phenol-formaldehyde resins, liquid crystal polymers, polyolefins, silicones, polyurethanes, epoxies, polyurethanes, cellulosic polymers, combinations of these, derivatives of these, or copolymers of any of the foregoing. The polymerizable materials can be a polymer or a polymerizable material such as a monomer, oligomer, or other polymerizable resin.

The carbon nanospheres are mixed with the polymeric material in a range of about 0.1% to about 70% by weight of the composite, more preferably in a range of about 0.5% to about 50% by weight, and most preferably in a range of about 1.0% to about 30%. The carbon nanospheres can be added alone or in combination with other graphitic materials to give the composite conductive properties. To impart electrical conductivity, it is preferable to add more than about 3% by weight of carbon nanospheres in the composite, more preferably greater than about 10% by weight, and most preferably greater than about 15%.

As a method for producing the composite of the present invention, any known method can be used. For example, pellets or powder of the polymeric material and a desired amount of the carbon nanospheres can be dry-blended or wet-blended and then mixed in a roll kneader while heated, or fed in an extrusion machine to extrude as a rope and then cut into pellets. Alternatively, the carbon nanospheres can be blended in a liquid medium with a solution or dispersion of the resin. When a thermosetting polymerizable material is used, the carbon nanospheres can be mixed with a monomer or oligomer using any known method suitable for the particular resin.

V. Examples

The following examples provide formulas for making carbon nanomaterials containing carbon nanostructures according to the present invention.

Example 1

Example 1 describes the preparation of an intermediate carbon nanomaterial having carbon nanospheres.

(a) Preparation of Iron solution (0.1 M)

A 0.1 M iron solution was prepared by using 84 g iron powder, 289 g of citric acid, and 15 L of water. The iron-containing mixture was mixed in a closed bottle on a shaker table for 3 days, with brief interruptions once or twice daily to purge the vapor space of the bottle with air gas before resuming mixing.

(b) Preparation of Precursor Mixture 916.6 g of resorcinol and 1350 g of formaldehyde (37% in water) were placed in a round bottom flask. The solution was stirred until resorcinol was fully dissolved. 15 L of the iron solution from step (a) was slowly added with stirring, and then 1025 ml of Ammonium hydroxide (28-30% in water) was added drop-wise with vigorous stirring, the pH of the resulted suspension was 10.26. The slurry was cured at 80~90° C. (water bath) for 10 hours. The solid carbon precursor mixture was the collected using filtration and dried in an oven overnight.

(c) Carbonization

The polymerized precursor mixture was placed in a crucible with a cover and transferred to a furnace. The carbonization process was carried out under ample nitrogen flow using the following temperature program: room temperature→1160° C. at a rate of 20° C./min→hold for 5 hrs at 1160° C.→room temperature. The carbonization step yielded an intermediate carbon material having carbon nanostructures, amorphous carbon, and iron.

Example 2

Example 2 describes a method for manufacturing a carbon nanomaterial with oxygen-containing functional groups introduced onto the surface of the carbon nanospheres using severe oxidation treatment. A portion of the intermediate product from Example 1 was oxidized using a mixture of sulfuric acid (98%) and nitric acid (70%) in a 3:1 v/v ratio.

The sample was reacted in the mixture for 48 h at 45° C. with ultrasonication. The product was rinsed in de-ionized water until the pH of the wash was neutral. The product was collected and then tested using XPS. The XPS analysis indicated surface O was 20 wt %.

Example 3

Example 3 describes a method for manufacturing a carbon nanomaterial with oxygen-containing functional groups introduced onto the surface of the carbon nanospheres using severe oxidation treatment. A portion of the intermediate product from Example 1 was oxidized using a solution of 30% hydrogen peroxide. The sample was reacted in the solution for 2 h at room temperature with ultrasonication. The product was rinsed in deionized water until the pH of the wash was neutral. The product was collected and then tested using XPS. The XPS analysis indicated surface O was 15 wt %.

Example 4

Example 4 describes a method for manufacturing a carbon nanomaterial with oxygen-containing functional groups introduced onto the surface of the carbon nanospheres using severe oxidation treatment. A portion of the intermediate product from Example 1 was oxidized using a mixture of sulfuric acid (98%) and hydrogen peroxide (30%) in a 4:1 v/v ratio. The sample was reacted in the mixture for 24 h at 45° C. with ultrasonication. The product was rinsed in deionized water until the pH of the wash was neutral. The product was collected and then tested using XPS. The XPS analysis indicated surface O was 18 wt %.

Example 5

Comparative Example

Mere Removal of Amorphous Carbon

For comparison purposes, a portion of the intermediate carbon nanomaterial was treated using an oxidative treatment typically used to merely remove amorphous carbon. A portion of the intermediate product from Example 1 was oxidized using 5M $HNO_3$ for 12 hours with reflux. The purified product was then rinsed in deionized water and then treated with a mixture of $KMnO_4+H_2SO_4+H_2O$ at a mole ratio of 1:0.01:0.003. The reaction with this mixture was carried out for 12 hours at 90° C. Finally, this product was then treated with 4M HCl for 12 hours at 90° C. and rinsed with deionized water. The product was then collected and tested using XPS. The XPS analysis indicated surface O was 9 wt %.

As demonstrated by these examples, the carbon nanospheres treated using a severe oxidation treatment can be caused to have significantly more oxygen-containing surface functional groups compared to oxidative treatments that are typically used to remove amorphous carbon from the surface of carbon nanomaterials. Moreover, the severe oxidative treatment was accomplished without destroying the general size and shape of the carbon nanospheres or their graphitic properties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:
1. A method for manufacturing a carbon nanomaterial, comprising,
   forming an initial precursor mixture comprising a carbon precursor and a plurality of templating nanoparticles, the templating nanoparticles comprising a catalytic metal;
   polymerizing the carbon precursor to form a polymerized precursor mixture;
   carbonizing the polymerized precursor mixture to form an intermediate carbon material comprising a plurality of carbon nanostructures, amorphous carbon, and optionally remaining catalytic metal;
   purifying the intermediate carbon material by removing at least a portion of the amorphous carbon and optionally a portion of any remaining catalytic metal to yield an at least partially purified intermediate carbon nanomaterial comprising the carbon nanostructures; and
   treating the at least partially purified intermediate carbon nanomaterial using a severe oxidative treatment to introduce oxygen-containing functional groups to the graphitic material of the carbon nanomaterial, wherein the severe oxidative treatment introduces at least 10 wt % oxygen to the surface of the carbon nanostructures, as measured using X-ray photoelectron spectroscopy (XPS).

2. A method as in claim 1, in which at least about 12 wt % oxygen, as measured using XPS is introduced to the surface of the carbon nanostructures by oxidative treatment.

3. A method as in claim 1, in which at least about 15 wt % oxygen, as measured using XPS is introduced to the surface of the carbon nanostructures by oxidative treatment.

4. A method as in claim 1, in which at least about 20 wt % oxygen, as measured using XPS is introduced to the surface of the carbon nanostructures by oxidative treatment.

5. A method as in claim 1, in which sonication is applied to the carbon nanostructures during at least a portion of the oxidative treatment.

6. A method as in claim 1, in which the oxidative treatment is selected from the group consisting (i) a mixture of nitric acid and sulfuric acid, (ii) a solution of hydrogen peroxide, or (iii) a mixture of sulfuric acid and hydrogen peroxide.

7. A method as in claim 1, in which the oxidative treatment is carried out using a mixture of nitric acid and sulfuric acid, wherein the nitric acid and the sulfuric acid are mixed in a volume to volume ratio in a range from about 1:10 to about 1:1 nitric acid to sulfuric acid.

8. A method as in claim 1, in which the oxidative treatment is carried out using a hydrogen peroxide solution with a hydrogen peroxide concentration in a range from about 50% to about 10% v/v.

9. A method as in claim 1, in which the oxidative treatment is carried out using a mixture of sulfuric acid and hydrogen peroxide, wherein the sulfuric acid has a concentration in a range from about 98% to about 20%, the hydrogen peroxide has a concentration in a range from about 50% to about 1%, and the sulfuric acid and the hydrogen peroxide are mixed in a volume to volume ratio in a range from about 10:1 to about 1:1.

10. A method as in claim 1, in which the templating nanoparticles are prepared by,
   (a) reacting a plurality of precursor catalyst atoms with a plurality of organic dispersing agent molecules to form complexed catalyst atoms; and (b) allowing or causing the complexed catalyst atoms to form the templating nanoparticles.

11. A method as in claim 1, in which the intermediate carbon material is purified by removing at least a portion of the residual catalytic metal.

12. A carbon nanomaterial comprising a plurality of carbon nanostructures manufactured according to the method of claim 1, wherein the carbon nanostructures have a BET surface area of at least about 120 m²/g.

13. A composite material comprising the carbon nanomaterial of claim 12 dispersed in a polymeric material.

14. A method for manufacturing a carbon nanomaterial, comprising,
   providing a carbon nanomaterial comprising a plurality of multi-walled carbon nanospheres, wherein the plurality of carbon nanospheres have a maximum diameter in a range from about 10 nm to about 200 nm, an aspect ratio of less than about 2, and an irregular surface having a plurality of graphitic defects; and
   introducing at least 10 wt % oxygen, as measured using X-ray photoelectron spectroscopy (XPS), to the surface of the carbon nanospheres by an oxidative treatment.

15. A method as in claim 14, in which at least about 15 wt % oxygen, as measured using XPS, is introduced to the surface of the carbon nanostructures by oxidative treatment.

16. A method as in claim 14, in which the oxidative treatment is selected from the group consisting of (i) a mixture of nitric acid and sulfuric acid, (ii) a solution of hydrogen peroxide, or (iii) a mixture of sulfuric acid and hydrogen peroxide.

17. A method as in claim 14, in which the oxidative treatment is carried out using a mixture of nitric acid and sulfuric acid, wherein the nitric acid and the sulfuric acid are mixed in a volume to volume ratio in a range from about 10:1 to about 1:1 nitric acid to sulfuric acid.

18. A method as in claim 14, in which the oxidative treatment is carried out using a hydrogen peroxide solution with a hydrogen peroxide concentration in a range from about 50% to about 10% v/v.

19. A method as in claim 14, in which the oxidative treatment is carried out using a mixture of sulfuric acid and hydrogen peroxide, wherein the sulfuric acid has a concentration in a range from about 98% to about 20% v/v, the hydrogen peroxide has a concentration in a range from about 50% to about 1% v/v, and the sulfuric acid and the hydrogen peroxide are mixed in a volume to volume ratio in a range from about 10:1 to about 1:1.

20. A method as in claim 14, wherein the nanospheres comprise at least 50 wt % of the graphitic material in the carbon nanomaterial and have a BET surface area of at least about 120 m²/g.

21. A carbon nanomaterial, comprising,
   a plurality of multi-walled carbon nanospheres comprising at least 10 wt % of the carbon nanomaterial, wherein the plurality of carbon nanospheres have a maximum diameter in a range from about 10 nm to about 200 nm, an aspect ratio of less than about 2, and an irregular surface having a plurality of graphitic defects; and
   at least 10 wt % oxygen on the surface of the graphitic material of the carbon nanomaterial, as measured using X-ray photoelectron spectroscopy (XPS).

22. A carbon nanomaterial as in claim 21, in which the surface of the graphitic material has at least about 15 wt % oxygen, as measured using XPS.

23. A carbon nanomaterial as in claim 21, in which the nanospheres comprise at least 50 wt % of the graphitic material in the carbon nanomaterial and have a BET surface area of at least about 120 m²/g.

24. A composite material comprising the carbon nanomaterial of claim 21 dispersed in a polymeric material.

* * * * *

UNITED STATES PATENT AND TRADEMARK OFFICE
CERTIFICATE OF CORRECTION

| | | |
|---|---|---|
| PATENT NO. | : 7,858,691 B2 | |
| APPLICATION NO. | : 11/869519 | |
| DATED | : December 28, 2010 | |
| INVENTOR(S) | : Zhang et al. | |

It is certified that error appears in the above-identified patent and that said Letters Patent is hereby corrected as shown below:

<u>Title page 1, Right Hand Column</u>
Change the reference "Garrigue, P., et al., "Top-Down Approach for the Preparation of Collodial Nanoparticles", *Chem. Mater.*, vol. 16, No. 16, pp 2984-2986 (2004)." to --Garrigue, P., et al., "Top-Down Approach for the Preparation of Colloidal Nanoparticles", *Chem. Mater.*, vol. 16, No. 16, pp 2984-2986 (2004).--

<u>Column 1</u>
Line 30, change "temperature" to --temperatures,--

<u>Column 2</u>
Line 10, change "includes" to --include--

<u>Column 3</u>
Line 63, after "metal" insert --, and--

<u>Column 7</u>
Line 35, after "For" insert --a--

<u>Column 10</u>
Line 21, change "affect" to --effect--

<u>Column 11</u>
Line 29, change "1 hours" to --1 hour--
Line 39, change "function groups" to --functional groups--

<u>Column 12</u>
Line 7, change "50 nm n." to --50 nm.--

Signed and Sealed this
Third Day of May, 2011

David J. Kappos
*Director of the United States Patent and Trademark Office*

Column 13
Lines 19-20, change "spheriodal" to --spheroidal--
Line 21, change "spheriodal" to --spheroidal--
Line 36, change "results" to --result--